April 13, 1965   W. S. EGGERT, JR   3,178,550
METHODS AND APPARATUS FOR WELDING SHEET MATERIAL
Filed Nov. 16, 1962   2 Sheets-Sheet 1
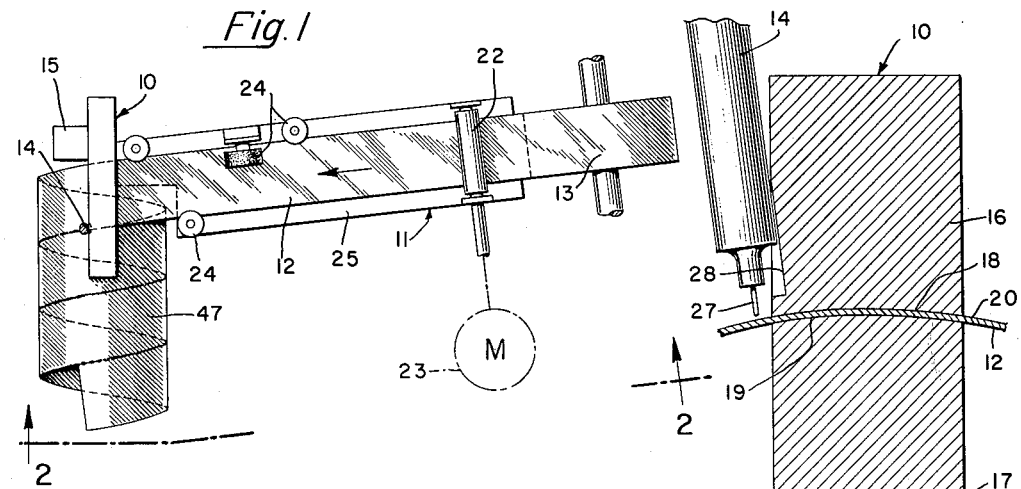
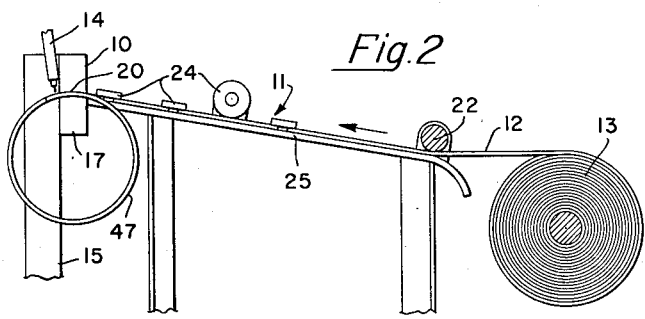
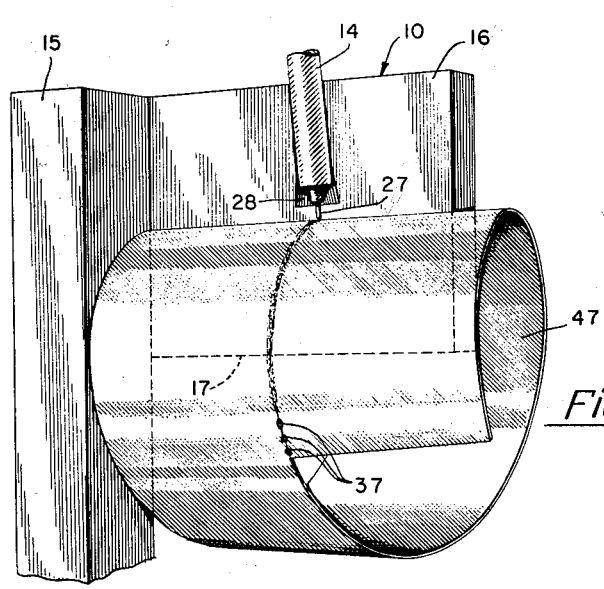
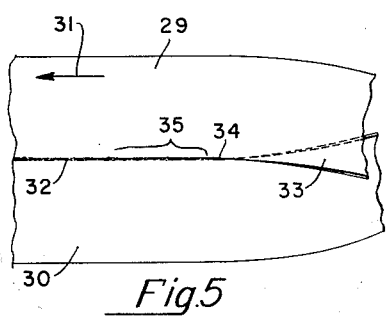
INVENTOR.
WALTER S. EGGERT, JR.
BY
Douglas R. McKechnie
ATTORNEY April 13, 1965   W. S. EGGERT, JR   3,178,550
METHODS AND APPARATUS FOR WELDING SHEET MATERIAL
Filed Nov. 16, 1962   2 Sheets-Sheet 2

INVENTOR.
WALTER S. EGGERT, JR.
BY
Douglas R. McKechnie
ATTORNEY

United States Patent Office
3,178,550
Patented Apr. 13, 1965

3,178,550
METHODS AND APPARATUS FOR WELDING
SHEET MATERIAL
Walter S. Eggert, Jr., Philadelphia, Pa., assignor to The
Budd Company, Philadelphia, Pa., a corporation of
Pennsylvania
Filed Nov. 16, 1962, Ser. No. 238,167
17 Claims. (Cl. 219—62)

This invention relates to methods and apparatus for welding sheet material to form continuous, butt-welded seams.

Welding thin, high strength, highly cold worked sheet metals, having thicknesses in the order of 0.0005" to 0.050" presents many problems which are difficult to successfully overcome. When a continuous seam is butt-welded by electric-arc welding techniques, the material around the weld becomes plastic and tends to buckle and distort the sheet metal along the seam upon cooling. Another problem arises because of the fact that it is difficult to align, mate and abut two edges of sheet material so that they can be butt-welded. This task is especially difficult where strips of sheet material are being continuously welded.

Accordingly, one of the objects of the invention is to provide improved methods and apparatus for butt-welding a continuous seam in sheet material in a manner that successfully overcomes the above problems.

Another object is to provide methods and apparatus for welding continuous or elongated sheets or strips of material to form a variety of shapes, such as cylinders, conical sections, wide sheets, etc.

The invention is particularly advantageous when used to form cylindrical tubes from continuous strips, this being done by forming the strips into a helix and welding the adjacent edges together. In the prior art, tubes have been formed in a similar fashion, i.e., by welding adjacent edges of a spirally-wound strip, but, it is believed that while the prior art is successful for relatively heavy gauge sheet material, it is not satisfactory for thin sheet material because of the inability to prevent buckling and mismatching of the welded edges. It is customary in such prior art apparatus to wind the sheet around the outside of a cylindrical inside mandrel or around the inside of the tubular outer mandrel, or to thread the strip through a plurality of forming elements, such as rollers. Examples of these various types of equipment are shown in U.S. Patents 1,793,280—Williams, 1,795,380—Stresau, and 3,024,348—Cavel.

Accordingly, another object of the invention is to provide improved methods and apparatus for forming cylindrical, tubular objects from coiled, elongated or continous strips or sheets of material.

Still another object is to provide a fixture which can be used to form cylindrical tubes of different diameters.

The invention is also advantageously applicable to forming a wide continuous strip or sheet of material. Refractory metals are available in coils whose widths are often considerably less than the needed width for some applications. By means of the invention, wide sheets or strips of materials, such as refractory metals, can be formed from a strip or strips of narrower width.

Other objects and advantages of the invention will be apparent from the following description taken in connection with the accompanying drawings, wherein:

FIG. 1 is a top plan view of one form of apparatus embodying the invention;

FIG. 2 is a side elevational view, looking generally along lines 2—2 of FIG. 1, of the apparatus of FIG. 1;

FIG. 3 is an enlarged perspective view of a portion of the apparatus shown in FIG. 1 illustrating the initial steps of forming a strip of metal into a cylindrical tube;

FIG. 4 is a transverse sectional view through the fixture;

FIG. 5 is a schematic top plan view of two strips illustrating one of the principles of operation of the invention;

Figure 6:
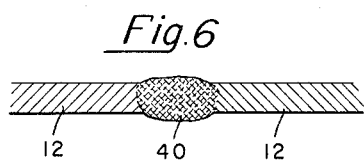
FIG. 6 is an enlarged cross-sectional view through a welded seam.

The invention is particularly applicable to welding highly cold-worked, high strength sheet metals, such as high nickel steels, having thicknesses from 0.0005" to 0.050", so as to produce continuous butt-welded seams. The invention however is not limited to such materials nor to the above range of thicknesses because it can be used for much thicker materials where prior art apparatus and methods are equally successful. Since the prior art is not successful for the thinner sheets because of the inability to overcome the problems discussed above, the invention finds particular utility for this range of thicknesses.

By means of the invention, a variety of shapes, such as cylinders, tubes, pipes, casings, conical sections, wide sheets, can be formed. Since the invention is particularly advantageous when used to form cylindrical, tubular objects and wide sheets, it is in connection with the formation of such objects that the apparatus of the invention has been illustrated.

Referring now to the drawings, the apparatus illustrated in FIGS. 1–4, is useful for forming cylindrical, tubular objects. The apparatus comprises a fixture 10, means, indicated by reference numeral 11, for feeding a strip 12 of sheet metal from a coil 13 through the fixture, and means, indicated by reference numeral 14, for welding the seam.

Fixture 10 is rigidly connected at one end in cantilever fashion to a column 15 of a suitable support frame so that the other end is free and extends horizontally away from the column. The fixture is metallic and block-shaped and consists of an upper portion 16 and a lower portion 17 having, respectively, a downwardly facing, concave, lower surface or edge 18 and an upwardly facing, convex, upper surface or edge 19 spaced apart so as to define therebetween an arcuate elongated slot 20 that extends longitudinally of the fixture.

Edges 18 and 19 are concentric about an axis that extends parallel to the fixure beneath it whereby such axis is also the axis of the slot. Edges 18 and 19 are spaced a distance slightly greater (1% to 3%) than the thickness of strip 12 and substantially less than twice the thickness of the strip, so that the strip is free to slide through the slot in such a manner that the edges of the strip cannot overlap. The length of that portion of slot 20, through which strip 12 passes is equal to the length of the free end of the fixture and is greater than the width of strip 12 but less than twice the width of the strip. One end of slot 20 is closed by column 15 and the other end of the slot is open so that, as the cylinder is formed, it moves outwardly through the open end of the slot.

Feeding means 11 can be of any suitable construction operative to push strip 12 along a controlled path through the fixture. As illustrated, the feeding means comprises a drive roller 22 adapted to be driven by a selectively operated motor 23, a plurality of guide rollers 24, and a support table 25 mounted on the support frame. Drive roller 22 engages strip 12 and pushes the strip, upon operation of motor 23, through slot 20 of the fixture at an angle corresponding to the angle of the helix of the cylinder being formed. As illustrated in FIGS. 1 and 2, the feeding means feeds strip 12 so that the strip, as it enters slot 20, is tangential to the entrance of the slot. When fed as illustrated in FIG. 2, the leading edge of the strip mates with the trailing edge of the preceding convolution immediately prior to the slot entrance so that the mated edges move through the fixture and remain abutted until they coalesce.

Welding means 14 is illustrated as an arc torch or welding head of the inert gas, metal arc welding type, wherein heating is produced by an electric arc that extends between an electrode 27 and the abutted edges of the work at a point closely adjacent to the point at which the edges emerge from slot 20 of fixture 10. In order that the electric arc can be located closely adjacent to this point of emergence, it may be necessary to notch fixture 10 as indicated at 28 to provide suitable clearance for the welding head. Preferably, the welding head is movable along its length so that it can be moved towards and away from the workpiece.

As will be pointed out more specifically hereafter, the use of a nonconsumable electrode produces a seam having a built-up appearance and it is unnecessary to use a consumable electrode to achieve a building up of metal. However, since some types of materials undergo changes in composition as they are heated, the electrode may be consumable and of an alloy designed to offset the effects of such changes in composition. The welding head is operated by any suitable apparatus designed to supply the necessary shielding gas and electric energy for operation of the welding head.

That the apparatus can be successfully used to weld thin sheet material might best be understood with reference to FIG. 5. If two strips 29 and 30 of metal are moved in the direction of arrow 31 past a welding head so that the mating edges between the strips are welded at 34 to form a continuous butt-welded seam 32, there is a tendency for those portions of the mated edges which succeed the portions already welded to overlap, as indicated at 33. This overlapping is believed to be caused by the thermal stresses set up during cooling of the fused or molten edges. At welding point 34, the edges are heated to their fusion temperature and as they move away from the welding head through a cooling zone 35, they solidify and shrink. This shrinking pulls the strips toward each other and forces the succeeding edges against one another whereby, if not restrained, the edges overlap as illustrated in FIG. 5.

In the present invention, the edges of the work are restrained from overlapping by edges 18 and 19 of fixture 10 so that the thermal stresses set up by the cooling of the welded portions force the edges, which are already engaged, to develop a high pressure therebetween. This developing of the high pressure occurs within fixture 10 and extends through the welding point so that, as the edges are heated by the welding head to their fusion temperature, the pressure, forcing the edges against one another, aids in fusing the metal.

The width of fixture 10, which is also the same as the length of the chord subtending the arc of slot 20, and the distance of electrode 27 from the point at which strip 12 emerges from slot 20, are chosen so that the point or zone at which the edges tend to overlap occurs within slot 20. Fixture 10 is sufficiently strong to restrain the edges against any movement radially of the curvature thereof in a direction tending to overlap the edges. As a rule of thumb, the width of the fixture can be about one hundred times the thickness of strip 12 and the distance of electrode 27 from the point of emergence of the work from slot 20 can be twenty to thirty times the thickness of the sheet material.

For a given thickness of strip 12, the width of fixture 10 is chosen as above so that the angle subtending the arc of slot 20 is dependent upon the radius of curvature of the slot. When a cylinder is being formed, this radius is chosen so that it is preferably the same as that of the cylinder being formed. However, it is not limited to such radius since a cylinder of either larger or smaller radius than that of the radius of curvature of slot 20 can be formed as pointed out hereafter with reference to FIG. 9. For smaller cylinders, the limiting factor would be the dimensions of lower portion 17 within the cylinder.

In operation, when it is desired to form a cylindrical tube, the leading end of strip 12 is first pushed through slot 20 until it projects a distance greater than the circumference of the tube being formed. Then the free end is looped and threaded through the open end of the slot to form the first convolution of the cylinder. The trailing edge of the end is then abutted against the leading edge of the first turn and the edges are tacked, as indicated at 37 in FIG. 3, as by fusing the edges at a couple of points, to fix the first convolution. This establishes the diameter of the first convolution and hence the diameters of the succeeding convolutions, and of the cylinder.

Next, feeding means 11 is operated to continuously feed strip 12 through fixture 10, and welding means 14 is simultaneously continuously operated whereby the electric arc at electrode 27 melts the abutted edges as they emerge from slot 20. The continuous feeding of strip 12 causes the leading end of the strip, which now forms the leading edge of the cylinder, to advance in a spiral fashion along the axis of the cylinder so that the cylinder rotates and emerges from the open end of the slot as the strip is fed to the fixture. When the cylinder being formed is long, additional support means can be provided to support its free end.

As strip 12 is pulled from coil 13 and fed to the fixture, the leading edge of the strip is continuously brought into mating, abutting contact with the trailing edge of the last formed convolution prior to the entrance of slot 20. Thereafter, the abutted edges move together through the fixture until they are fused or coalesced by the welding process. As the abutted edges pass through the fixture, the successive transverse portions containing such edges are arcuately flexed or bent to the curvature of slot 20 about an axis that extends transversely of the edges. The slot does not permanently bend the strip but the final curvature of the cylinder is maintained because the seam is welded.

By thus bending successive transverse portions into longitudinally extending arcs, two results are obtained. First, the bending facilitates the alignment or mating of the edges of the work. It is difficult to align straight edges of two sheets of metal when such edges are flat, both because of the difficulty of placing the sheets in the same plane and because of the fact that the edges may be slightly rippled and therefore incapable of true abutting contact. By bending the sheets into an arc, the rippling effect is eliminated and the edges can be placed more readily into abutting, aligning contact. Second, the bending increases the moment of inertia of the cross seciton and thereby increases the resistance to deflection. Therefore, the transverse portions are stronger than would be the case if they were flat. This bending, coupled with the restraint against overlapping, is believed to be the reason why the present invention is successful for welding thin sheet material.

With reference to FIG. 6, when the edges of two strips 12 are welded in the manner of the invention with the use of a non-consumable electrode, a seam 40 is produced which has a thickness in the order of 10% greater than that of each strip. Thus the seam appears to be built up. The built-up seam is believed to be caused by the shrinking process which occurs during cooling of the welded seam that tends to pull the sheets together.

Figure 7:
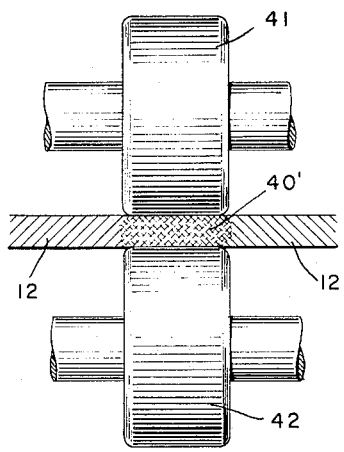
FIG. 7 is a view similar to FIG. 6 but additionally illustrating sizing means.
Figure 8:
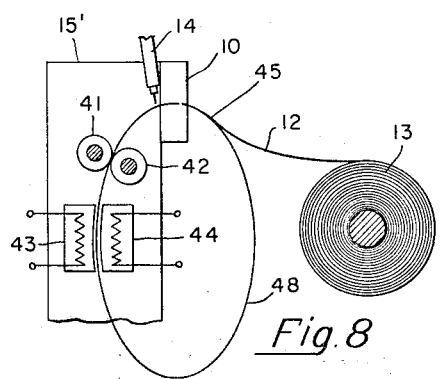
FIG. 8 is a schematic elevational view showing a modified form of the apparatus.

When a thicker seam is not wanted, as in the case where the wall thickness must be uniform, or when there is some buckling or rippling (which might occur where cylinders of large diameter or where large thin, flat sheets are formed) a sizing operation can be performed to flatten the seam. Thus, as illustrated in FIGS. 7 and 8, a pair of sizing rollers 41 and 42 are disposed on opposite sides of the seam and are spaced apart a distance substantially equal to the thickness of strip 12 whereby the seam, as it passes between the rollers, is flattened to form a flat seam 40'. Obviously, this flattening increases the length of the seam and of the workpiece slightly.

Thus, another advantage of the invention is that additional forming operations, such as sizing, heat-treating, etc., can be performed immediately after the welding operation with equipment mounted in the vicinity of the welding apparatus. In prior art apparatus, especially that employing inside or outside mandrels, this is impossible to do since the additional operations have to be performed either by elaborate equipment or by additional apparatus set up elsewhere.

Thus, with reference to FIG. 8, strip 12 is fed from coil 13 through fixture 10 by suitable feeding means omitted from this figure for the sake of simplicity. The strip is welded by welding head 14 to form a cylinder having a spiral seam, as previously described. Sizing rollers 41 and 42 flatten the seam after it has cooled appropriately and a pair of heated platens 43 and 44, one inside and one outside of the work, heat-treat the seam immediately after sizing. The rollers 41 and 42 and the platens 43 and 44 can be suitably mounted on support column 15'.

FIG. 8 also illustrates another feature of operation. Strip 12 is fed from coil 13 along an arcuate path, instead of a flat path as illustrated in FIG. 2, that includes a reverse bend and camber, which facilitates feeding of the strip and tends to prevent buckling thereof. The leading edge of strip 12, therefore, can be first brought into contact with the trailing edge of the last formed convolution at a point, indicated by numeral 45, angularly spaced from and prior to the entrance of slot 20.

Figure 9:
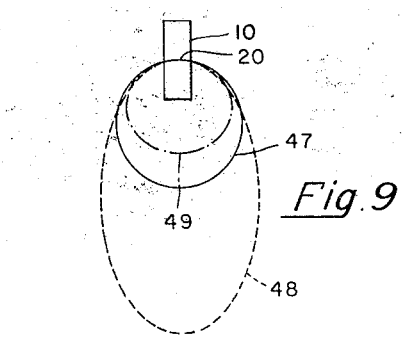
FIG. 9 is a schematic elevational view illustrating the forming of different diameter cylinders with a given fixture.

Referring now to FIG. 9, when fixture 10 is used to form a cylinder, the radius of curvature of slot 20 is preferably the same as that of the cylinder 47 to be formed. In such a case, the friction caused by movement of the strip through fixture 10 and slot 20 is at a minimum. However, the fixture can also be used to form a cylinder 48 of a radius larger than that of slot 20 and to form a cylinder 49 having a radius smaller than that of slot 20. Under such circumstances, when a larger cylinder is being formed, the curvature of slot 20 tends to form the end of the cylinder as it is formed into an elliptical shape wherein the major axis of the ellipse is vertical, as illustrated. In the case of forming a cylinder of smaller diameter, the end of the cylinder being formed has an elliptical shape wherein the major axis is horizontal, as shown in this figure.

Figure 10:
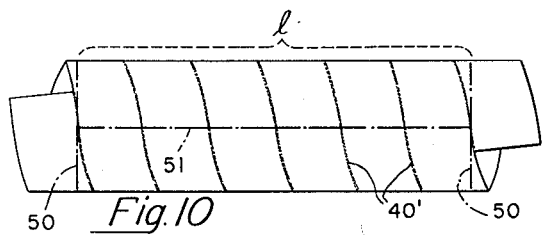
FIGS. 10 and 11 are plan views illustrating one way of forming wide sheets.
Figure 11:
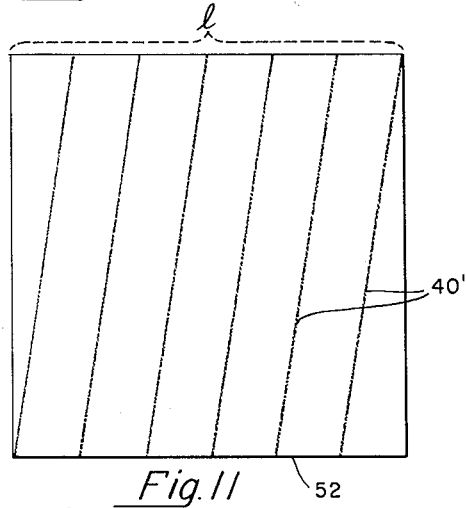

As previously indicated, many materials, especially refractory metals, are available in strips of narrow width, and, where a strip of greater width is desired, it can be formed as illustrated in FIGS. 10 and 11. First, a cylinder is formed as previously described and this cylinder is cut along transverse lines 50 to form a right angle cylinder of length *l*. The cylinder is then cut longitudinally along line 51 and flattened to form a flat sheet 52 having a length *l* (the same as the length *l* of the cylinder) and having a width corresponding to the circumference of the cylinder.

Figure 12:
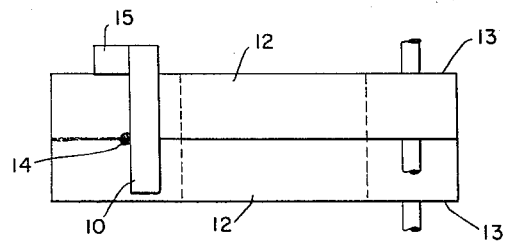
FIGS. 12 and 13 are schematic top plan and side elevational views, respectively, illustrating another embodiment of the invention.
Figure 13:
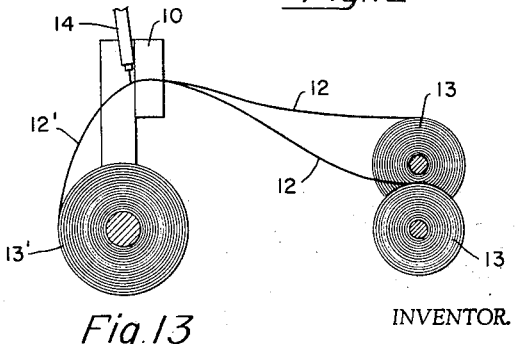

Another way to form a sheet of greater width is illustrated in FIGS. 12 and 13 wherein a pair of adjacent strips 12 are fed from a pair of coils 13 through fixture 10 in a direction at right angles thereto so that the welding head 14 welds the abutted edges to form a strip 12' that can be wound into a coil 13'. Obviously, strip 12' is equal to the combined widths of strip 12. The feeding means (omitted for simplicity) of the embodiment, as well as that of the embodiment of FIG. 8, includes some form of driving means and guide means similar to that illustrated in FIGS. 1 and 2, operative to feed each strip along the desired controlled path.

In conclusion, it is to be understood that various other modifications of the invention can be made and that the invention is not to be considered as being limited by the specific descriptions above given as illustrative of the invention, since many changes and modifications may be made in the details of construction and steps without departing from the scope of the invention as defined in the appended claims.

What is claimed is:

1. A method of forming a continuous butt-welded seam in sheet material, comprising the steps of: mating those edges of the sheet material from which the seam is formed; moving said sheet material so that it travels in a direction along the mated edges; simultaneously arcuately bending the sheet material transversely of the mating edges and positively restraining the mating edges from movement in either direction out of mating engagement; and then welding the mating edges at a point adjacent to those portions undergoing said bending and restraining.

2. A method of forming a continuous butt-welded seam in sheet material, comprising the steps of: moving the sheet material so that the edges from which the seam is formed are first brought together in mating contact and then travel along their lengths; bending successive portions of the sheet material transversely of the mating edges; restraining those portions of the mating edges which are undergoing said bending from overlapping in either direction due to shrinkage caused by fusing of the welded seam; and then welding the mating edges into a seam by heating the edges to their fusion temperature at a point closely adjacent to those portions undergoing said bending and restraining.

3. A method of forming a welded butt joint along mating edges of sheet material, comprising the steps of: bending successive transverse portions of said mating edges into longitudinally extending arcs; restraining the successive portions, as they undergo said bending, from overlapping by restraining movement thereof in inwardly and outwardly radial directions relative to the arc of bending; and welding said successive portions immediately after said bending and restraining.

4. A method of forming a welded butt joint along mating edges of sheet material, comprising the steps of: positively restraining successive portions of said mating edges against movement in any direction out of mating relationship; bending said successive portions, as they are restrained, about an axis that extends transversely of the edges; and welding said successive portions, immediately after said bending and restraining, by heating the edges to their fusion temperature and then cooling them to fuse them together into a seam.

5. A method of forming a continuous butt-welded seam in sheet material, comprising the steps of: bringing together the edges from which the seam is formed; moving the sheet material so that it travels along a path extending in the direction of the edges; simultaneously increasing the resistance of the sheet material to deflection in a direction normal to the surfaces thereof and preventing movement of the edges in either direction out of abutting relationship, as the edges move along a first portion of their path of travel; heating the edges to their fusion temperature as the edges emerge from said first portion of the path of travel; and cooling the edges to fuse them together as they move along a second portion of their path of travel.

6. A method of forming a continuous butt-welded seam in sheet material, comprising the steps of: bringing the edges from which the seam is formed into abutting contact; moving the sheet material along the edges; bending successive transverse portions of the sheet material into longitudinal arcs that extend for at least a short distance along the path of travel of the abutted edges; restraining successive portions of the sheet material, during bending thereof, so as to prevent the abutted edges from overlapping; and welding the abutted edges as they pass from that point of their path of travel where they are bent and restrained.

7. A method of forming a cylindrical tube from an elongated strip of metal, comprising the steps of: continuously feeding and forming the strip into a helix having the edges of successive convolutions abutted; welding the edges at a point angularly spaced a short arc from the point at which the edges are first brought together; and preventing the abutted edges from overlapping in either direction by positively restraining them over arcuate portions thereof which lie between the points of welding and where the edges are brought together and in a zone where fusing of the welded seam presses abutted edges against one another.

8. A method of forming a wide strip of sheet material from a single strip of narrower width, comprising the steps of: forming said strip into a helix by feeding the strip so that one edge moves into mating abutment with the trailing edge of the last-formed convolution of the helix; welding the butted edges at a point angularly spaced less than one convolution from the point at which the edges are first abutted to form a cylinder; preventing the edges from overlapping by restraining arcuate portions thereof which lie between the point of welding and where the edges are brought together by passing such edges through a slot in a fixture; and cutting the cylinder thus formed longitudinally along one wall.

9. A method of forming a wide strip of metal from a plurality of strips of narrower widths, comprising the steps of: feeding said narrow strips along adjacent paths so that adjacent edges are brought into mating abutting contact; flexing successive portions of the strips into arcs that extend longitudinally of the mated edges; simultaneously with said flexing, restraining those portions thus flexed so that the edges are prevented from overlapping in either direction; and welding said edges to form a single strip by heating the edges to their fusion temperature at a point closely adjacent to those portions undergoing said flexing and restraining.

10. A method of forming a welded butt joint along mating edges of sheet material, comprising the steps of: moving the sheet material so that mating edges move past a welding head; welding said edges by means of said welding head; and simultaneously restraining the edges against movement out of mating relationship over that portion of the path of movement thereof immediately prior to the welding head and bending the sheet material, as it is being restrained, about an axis that extends transversely of the direction of movement of the sheet material, by means of concentric curved surfaces spaced apart a distance slightly greater than the thickness of the sheet material and slidably engaged therewith.

11. A method of butt-welding a sheet metal seam, comprising: moving the sheet metal along the seam past a welding head; welding the seam as it passes said head; positively restraining the sheet metal against movement in both directions out of the plane of the seam; and bending the sheet metal while it is being restrained and welded, about an axis of curvature that extends transversely of the seam.

12. A method of forming a welded butt joint along mating edges of sheet material, comprising the steps of: moving the sheet material along the mating edges past a welding head; continuously welding the edges as they pass by said welding head; restraining those portions of the sheet material which are about to move past said welding head against movement in all directions tending to overlap the mating edges; and bending those portions of the sheet material thus restrained so as to bend transverse portions into a longitudinally extending arc.

13. A method of forming a welded butt joint along mating edges of sheet material, comprising the steps of: providing a fixture having an arcuate elongated slot of a thickness slightly greater than the thickness of the sheet material; passing the sheet material through the slot so that the fixture extends across the mating edges; and welding the mating edges by use of an electric arc that heats the edges as they emerge from the fixture.

14. A method of forming a welded butt joint along mating edges of sheet material, comprising the steps of: providing a fixture having a slot of a thickness slightly greater than that of the sheet material and of a curvature arranged to arcuately bend the sheet material about an axis that extends transversely of the mating edges; passing the sheet material through the slot whereby the mating edges pass through a medial portion of the fixture; heating the mating edges to their fusion temperature as they emerge from the slot; and thereafter cooling the edges to form a fused seam.

15. A method of forming a tubular object from an elongated sheet of metal, comprising the steps of: providing a fixture having an arcuate slot of a thickness slightly greater than that of the sheet; threading the leading end of the sheet through the slot to form a single convolution of predetermined diameter; tacking the leading end to fix the first convolution; and thereafter continuously feeding the sheet through the slot to form successive convolutions having contiguous abutting edges and welding such edges as they emerge from the fixture to form a continuous butt-welded seam.

16. In apparatus for butt-welding seams in sheet material, the combination of: a fixture having a workpiece slot of arcuate transverse cross section, said slot having a thickness slightly greater than that of the sheet material and a length whereby the fixture extends across and beyond the seam being welded; means adapted to feed a workpiece through said slot in a direction transversely of said fixture; and means adapted to weld the workpiece as it emerges from said slot, at a point whereby fusion of the weld forces trailing edges against each other in said fixture.

17. Apparatus in accordance with claim 16 and including means located on opposite sides of the workpiece and adapted to further operate on the workpiece after welding thereof.

References Cited by the Examiner

UNITED STATES PATENTS

| 2,459,625 | 1/49 | Copp | 219—101 |
|---|---|---|---|
| 3,046,382 | 7/62 | Morris | 219—62 |
| 3,073,945 | 1/63 | Osterer et al. | 219—62 |

RICHARD M. WOOD, *Primary Examiner.*